United States Patent [19]

Corren et al.

[11] 3,948,812
[45] Apr. 6, 1976

[54] CONDUCTIVE COMPOSITIONS AND PROCESSES THEREFOR

[75] Inventors: Sidney A. Corren, Katonah; Myron A. Coler, Scarsdale, both of N.Y.

[73] Assignee: Myron A. Coler, Scarsdale, N.Y.

[22] Filed: Mar. 26, 1974

[21] Appl. No.: 454,860

Related U.S. Application Data

[63] Continuation of Ser. No. 199,309, Nov. 16, 1971, abandoned, which is a continuation of Ser. No. 84,504, Oct. 27, 1970, abandoned, which is a continuation of Ser. No. 818,394, April 22, 1969, abandoned, which is a continuation-in-part of Ser. No. 340,823, Jan. 28, 1964, abandoned.

[52] U.S. Cl. ............... 252/512; 252/518; 252/515
[51] Int. Cl.² ........................................... H01B 1/02
[58] Field of Search .......... 252/500, 512, 518, 515, 252/502

[56] References Cited

UNITED STATES PATENTS

| | | | |
|---|---|---|---|
| 2,221,286 | 11/1941 | Hansel | 252/512 |
| 2,415,036 | 1/1947 | Quinn | 252/512 |
| 2,679,568 | 5/1954 | Smith | 252/518 |
| 2,888,406 | 5/1959 | Bondley et al. | 252/518 |
| 2,992,960 | 7/1961 | Yeomans et al. | 252/500 |

*Primary Examiner*—John D. Welsh

[57] ABSTRACT

Hard, refractory bodies having electrical conductivity are made by mixing powdered boron and glass-forming material, and heating the mixture at high temperature to effect coalescence. Desirably, chromium, molybdenum or tungsten may be used in addition to boron to impart electrical conductivity to the insulator glass matrix. These refractory bodies are capable of withstanding temperatures above 500°C.

25 Claims, No Drawings

CONDUCTIVE COMPOSITIONS AND PROCESSES THEREFOR

BACKGROUND OF THE INVENTION

This application is a continuation of abandoned application Ser. No. 199,309 filed Nov. 16, 1971, which is a continuation of abandoned application Ser. No. 84,504 filed Oct. 27, 1970, which is a continuation of abandoned application Ser. No. 818,394 filed Apr. 22, 1969, which is a continuation-in-part of abandoned application Ser. No. 340,823 filed Jan. 28, 1964.

This invention relates to novel conductive bodies and to processes for preparing the same. More particularly, the invention relates to electrically conductive bodies comprising boron and glass-forming material; preferably, such bodies also contain at least one of the Group 6b metals.

There is need for electrically conductive bodies which can withstand high temperatures above 500°C and preferably in the region of 1000°C. Available conductive bodies for high temperature service are not entirely satisfactory.

An object of this invention is to provide glass-like, electrically conductive bodies which are stable and operative at high temperatures.

Another object is to provide a simple process for the production of such conductive bodies from certain metals and glass-forming material.

These as well as other objects and advantages of the invention will be apparent from the description and illustrative embodiments which follow.

SUMMARY OF THE INVENTION

In accordance with this invention, glass-like electrically conductive bodies of varying electrical properties are made by admixing finely divided boron with an insulator glass matrix in finely divided particulate form. The resulting admixture is subjected to high temperature to effect coalescence or sintering to produce a hard, refractory conductive body. Desirably, at least one metal selected from Group 6b of the Periodic Table (as shown in the Periodic Table of the Elements, pp. 448–449, Handbook of Chemistry and Physics, 44th Edition) is used in addition to boron to produce the hard, refractory conductive body. Although the addition of metals from Group 6b alone to glass-forming materials does not give satisfactory conductive bodies following treatment at elevated temperature, the presence of a very small amount of boron in the admixtures prior to treatment at elevated temperature leads to the formation of hard, refractory bodies having excellent electrical properties.

The elements of Group 6b of the Periodic Table useful in this invention are chromium, molybdenum, tungsten and mixtures thereof. The illustrative embodiments set forth below will demonstrate the outstanding electrical properties which result when a Group 6b metal is employed in conjunction with boron in formulating the novel conductive bodies of this invention. These metals may also be employed in the form of alloys, intermetallic compounds such as chromium boride and molybdenum boride, and sulfides such as tungsten sulfide and molybdenum sulfide.

Referring to the conductive component of the novel bodies of this invention, it is well to note that while boron may be used alone, it may be present in a very small amount when used together with one or more of the Group 6b elements. More specifically, boron together with 0 to 99% by weight of a Group 6b metal selected from the group consisting of chromium, molybdenum, tungsten, and mixtures thereof, based on the total weight of metals present, may be added to glass-forming material to produce a conductive body. Preferably, the conductive component comprises about 1 to 30% by weight of boron and 70 to 99% by weight of at least one Group 6b metal. The finely divided metals used in this invention are generally in a particle size range of about 100 to 325 mesh.

It was quite unexpected that a powdered admixture of boron alone with glass-forming material would result in a hard, refractory body having excellent electrical conductivity after being heated to effect coalescence. It was even more unexpected that a very small amount of boron could be employed in conjunction with metals of Group 6b and glass-forming material to produce hard, refractory bodies with outstanding conductive properties. Although it is believed that some reaction takes place between the glass-forming material and the metal or metals present in the starting mixture, the exact reasons for the attainment of the electrical properties are not fully understood at this time. It was found in the literature that a conductor composed of chromium boride has a specific resistance of $64 \times 10^{-3}$ ohm-cm., whereas a refractory body made from a powdered mixture of chromium boride and glass-forming material, i.e., 1 weight part of CrB plus 2 weight parts of glass, heated at 1000°C for 1 hour had a specific resistance of $17 \times 10^{-3}$ ohm-cm.

The non-conductive or insulator component of the novel bodies of this invention is broadly glass-forming material which includes the various types of silica glasses, borate glasses, phosphate glasses, slags, fluorite, frits used in making glazes and enamels, clays having natural glass-forming constituents, and mixtures thereof, the selected glass-forming material being capable of being sintered or fused at high temperature to produce a hard, refractory body.

While glass-forming material is essential to the non-conductive component of the novel bodies of this invention, a refractory diluent which will not sinter by itself at the high temperatures employed to sinter the glass-forming material may be used together with the glass-forming material to provide the non-conductive component. Such a refractory diluent is kaolin, alumina, silica, steatite, chromite, magnesite, zircon or the like.

Both the glass-forming material and the refractory diluent, if used, should be in finely divided form, usually in a particle size range of about 100 mesh to submicron size. A particle size of the order of 325 mesh is in most cases satisfactory.

When used, the refractory diluent will generally not be in excess of about 70% of the total weight of the non-conductive component. Therefore, the glass-forming material will vary from about 30 to 100% of the total weight of the non-conductive component of the novel bodies of this invention.

A wide range of electrical conductivities is achieved pursuant to this invention by combining 10 to 90% by weight of the conductive component with 90 to 10% by weight of the non-conductive component at high temperatures to form hard, refractory bodies. Preferably, the conductive component does not exceed 50% by weight of the hard, refractory body produced therewith.

In accordance with one aspect of this invention, hard, refractory, conductive bodies may be prepared by initially combining boron, alone or with a Group 6b metal such as chromium, with a glass-forming material such as high lead glass frit or borosilicate glass frit, all in finely divided form and in uniform admixture, at a temperature in the range of about 800° to 1200°C. The resulting conductive body is then ground to a powder of about 325 mesh. This powder may be uniformly admixed with a finely divided refractory diluent such as kaolin in varying proportions and again heated at a temperature generally in the range of about 800° to 1350°C sufficient to produce hard, refractory bodies of different desired electrical conductivities. The proportion of refractory diluent used should not exceed about 70% of the total weight of the non-conductive component in the final conductive refractory body. Utilizing this process, the initial product obtained by combining 0.8 weight part of chromium, 0.2 weight part of boron and 2 weight parts of lead glass frit at 850°C had a resistance of 0.2 ohm. After reforming 85% by weight of the initial product, in finely divided form, and 15% by weight of kaolin, by compaction and sintering at 1025°C, the resulting conductive body had a resistance of 9.5 ohms. Therefore, by this process of varying the amount of refractory diluent, conductive bodies having different desired resistance values as well as outstanding physical characteristics can be readily prepared from a predetermined product of this invention comprising the conductive component and the glass-forming material, kept as a stock preparation in finely divided form.

Another process for making the sintered bodies of this invention comprises initially mixing the fine powders of the boron, either alone or preferably with a Group 6b metal, and the glass-forming material, either alone or with a refractory diluent, in one step. For ease of handling, a minor amount of water or other liquid may be added to the mixture, although the use of water or other liquid is neither necessary nor essential to this process. The resulting mixture is next compacted into the desired shape by conventional means, which will depend in large measure upon the final form of the article of manufacture. It is generally advantageous to employ pressure to compact the mixed powders. Although the exact pressure employed is not critical, it has been found useful to employ pressures in the range of about 4000 to 10,000 pounds per square inch. Following compaction, the shaped mass is dried at progressively higher temperatures up to about 120°C in order to remove as much water as possible from the mass prior to sintering it. The temperature employed for drying or the percentage of water removed are not critical. As is well-known in the ceramic art, the preliminary drying step is employed in order to avoid the sudden expulsion of water from the compacted mass at the elevated temperatures necessary to accomplish coalescence or sintering. The compacted mixture is next subjected to fusion or sintering in an electric furnace or kiln, for example, although other conventional equipment may be readily employed. The temperatures employed in this sintering step need only be sufficient to obtain a hard, refractory, conductive body. In general, temperatures in the range of about 800° to 1350°C have been found quite effective, and for most purposes the preferred temperature is usually above the softening point of the glass-forming material which is initially present or which is formed during the sintering step.

The sintering time may also vary over a wide range, and it need only be sufficient to produce the desired hard, refractory, conductive body. An effective time range has been found to be between about 0.5 and 48 hours, preferably about 1 to 4 hours. The actual upper limits for sintering temperature and time are those below which bubble formation in the glass matrix formed during sintering is avoided. The lower limits are, in general, dependent upon the type of glass-forming material employed. The time will to some extent be determined by the temperature used. Thus, a higher temperature requires a shorter time period.

It has further been found that, if a conductive surface is desired on the product, then air, and more specifically oxygen, should be excluded from the atmosphere in which sintering is effected. Even if oxygen is present in the sintering zone, a conductive body will be formed. Nevertheless, it is usually advantageous to employ a carbon dioxide, nitrogen or like inert atmosphere in the sintering zone or to enclose the compacted mixture being sintered in a carbon container.

Although it is not desirable to limit in any way the invention and the results obtained thereby to theory, it is surprising and unexpected that conductive bodies are obtained. Since the glass-forming material is very finely divided, it would be expected that the conductive metallic particles would be completely coated with the insulator particles and no electrical conductivity would be obtained. Contrary to this expectation, the refractory bodies of this invention have excellent electrical conductivities.

The refractory bodies of this invention find most frequent use as resistors and resistance devices; they may also be employed in other electrical application. By appropriate adjustment of the proportions of the conductive and non-conductive components, it is relatively easy to obtain refractory bodies having various predetermined resistances as may be required. The resistance devices made pursuant to this invention can be used for such rigorous service and under such high temperature conditions as are encountered in missiles and rockets. For example, a refractory, conductive body of this invention had a resistance temperature coefficient of 600 parts per million per degree C between 20° and 1000°C, which compares favorably with platinum.

The conductivity of the refractory bodies of this invention is measured as follows. The ends of the body are sanded with 400 grit emery cloth to present a fresh surface. The conductive body with its two sanded ends is then positioned between silver foils backed by soft rubber in a vise. An S.I.E. Model C3 Resistance Meter is then attached to the silver foils and a direct reading of the resistance is taken.

DESCRIPTION OF PREFERRED EMBODIMENTS

Various embodiments of the invention are presented herebelow by way of illustration only and are not to be construed in any way as limiting the invention.

A series of refractory bodies was prepared in accordance with the formulations set forth in the following tables. The mixed powders were compacted and heated at 100°C for 2 hours in a carbon dioxide atmosphere. Test rods of these bodies were made about 1 cm. long with a 0.6 cm. diameter.

The following terms, as employed in the tables and specification, have these meanings:

Ebner Clay — a commercially available clay containing glass-forming constituents which are sintered at 850°C.

High lead glass frit — a product containing calcium oxide, lead oxide, aluminum oxide, boron oxide and silicon oxide, sold as G-24 by Ferro Corp.

Borosilicate glass frit — a product containing aluminum oxide, boron oxide, silicon oxide and magnesium oxide, sold as No. 3249 by Ferro Corp.

The symbol "K" is equivalent to 1,000.

The symbol "NC" means that the body tested is non-conductive.

TABLE I

EFFECT OF CHROMIUM ADDITION

| Component | Compositions, Parts by Weight | | | | | | |
|---|---|---|---|---|---|---|---|
| | A | B | C | D | E | F | G |
| Boron | 1 | 1 | 1 | 0.2 | 0.2 | 0 | 0.02 |
| Chromium | — | — | 0.2 | 0.8 | 0.8 | 1 | 1 |
| Ebner Clay | 2 | — | — | 2 | — | — | — |
| High Lead Glass Frit | — | 2 | 2 | — | 2 | 2 | 2 |
| Resistance, Ohms | 200K | 600K | 35 | 18 | 0.2 | NC | 3 |

The above data show that the use of boron in combination with chromium results in the production of hard, refractory bodies having outstanding electrical conductivity. Even the addition of a very small amount of boron, as in Composition G, gave excellent conductivity, whereas Composition F, having no boron, failed to give a conductive body. It is also shown that the conductivity can be varied with the metals as well as the type of glass matrix employed.

TABLE II

EFFECT OF BORON ADDITION

| Component | Compositions, Parts by Weight | | | | | | | |
|---|---|---|---|---|---|---|---|---|
| | H | I | J | K | L | M | N | O |
| Boron | — | — | — | 0.2 | 0.2 | 0.2 | 0.02 | 1 |
| Chromium | 1 | 1 | 1 | 0.8 | 0.8 | 0.8 | 1 | 0.2 |
| Ebner Clay | 2 | — | — | 2 | — | — | — | — |
| High Lead Glass Frit | — | 2 | — | — | 2 | — | 2 | 2 |
| Borosilicate Glass Frit | — | — | 2 | — | — | 2 | — | — |
| Resistance, Ohms | NC | NC | NC | 18 | 0.2 | 1 | 3 | 35 |

These data demonstrate that the presence of boron in the formulation is an essential and critical feature of the present invention. In the absence of boron, chromium failed to contribute conductivity to the bodies of Compositions H, I and J.

TABLE III

EFFECT OF ADDITION OF GLASS-FORMING MATERIAL

| Component | Compositions, Parts by Weight | | | | | | | | | | |
|---|---|---|---|---|---|---|---|---|---|---|---|
| | P | Q | R | S | T | U | V | W | X | Y | Z |
| Boron | 0.2 | 0.2 | 0.2 | 0.2 | 0.2 | 0.2 | 0.2 | 0.2 | 0.2 | 0.2 | 0.2 |
| Chromium | 0.8 | 0.8 | 0.8 | 0.8 | 0.8 | 0.8 | 0.8 | 0.8 | 0.8 | 0.8 | 0.8 |
| Kaolin | 2 | — | — | — | — | — | — | — | 0.2 | 0.5 | 1 |
| SiO$_2$ | — | 2 | — | — | — | — | — | — | — | — | — |
| Al$_2$O$_3$ | — | — | 2 | — | — | — | — | — | — | — | — |
| Ebner Clay | — | — | — | 2 | — | — | — | — | — | — | — |
| High Lead Glass Frit | — | — | — | — | 2 | — | — | — | 1 | 1 | 1 |
| Borosilicate Glass Frit | — | — | — | — | — | 2 | — | — | — | — | — |
| Sodium Silicate | — | — | — | — | — | — | 2 | — | — | — | — |
| PbO+.1B$_2$O$_3$ | — | — | — | — | — | — | — | 2 | — | — | — |
| Resistance, Ohms | NC | NC | NC | 18 | 0.2 | 13 | 1.2 | 0.1 | 0.2 | 150 | |

The above data demonstrate that presence of glass-forming material is an important and essential feature of the present invention. The use of a refractory material such as kaolin, silica and alumina failed to produce a conductive body even though both boron and chromium were employed in the formulation. In contrast, Ebner clay containing glass-forming constituents, as well as glass-forming substances as in Compositions V and W were quite effective for the production of hard, refractory bodies characterized by outstanding electrical conductivity.

TABLE IV

EFFECT OF TUNGSTEN OR MOLYBDENUM ADDITION

| Component | Compositions, Parts by Weight | | | | |
|---|---|---|---|---|---|
| | A' | B' | C' | D' | E' |
| Tungsten | 1 | 1 | 1.3* | — | — |
| Molybdenum | — | — | — | 0.96* | 0.90* |
| Boron | 0.6 | — | 0.6 | 0.11 | 0.01 |
| High Lead Glass Frit | 2 | 2 | 2 | 2 | 2 |
| Resistance, Ohms | 8 | NC | 7.5 | 1 | 1.2 |

*Added as sulfide

The above data demonstrate that the addition of tungsten or molybdenum is comparable to the addition of chromium.

In order to demonstrate the effects achieved by varying the percentage by weight of glass matrix in the total refractory body, the following compositions were prepared. Each of the compositions contained 0.2 parts by weight of boron and 0.8 parts by weight of chromium.

TABLE V

| Matrix | Compositions | | | | | | |
|---|---|---|---|---|---|---|---|
| | H' | I' | J' | K' | L' | M' | N' |
| Ebner Clay, % by Weight | 9.1 | 33.3 | 67.7 | 75.0 | 85.7 | — | — |
| High Lead Glass Frit, % by Weight | — | — | — | — | — | 67.7 | 83.3 |
| Resistance, Ohms | 2 | 3 | 10 | 112 | 1.5K | 0.2 | 400 |

Several other conductive bodies are shown in Table VI to illustrate other aspects of the invention.

TABLE VI

| Component | Compositions, Parts by Weight | | | | | | | | | |
|---|---|---|---|---|---|---|---|---|---|---|
| | AA | BB | CC | DD | EE | FF | GG | HH | II | JJ |
| Boron | 0.1 | 1 | 0.1 | — | — | — | — | — | — | 0.5 |
| Chromium | — | — | — | 1* | 1* | 1* | 1* | 1* | 0.1* | 0.5* |
| Molybdenum | 0.96* | 0.96* | 0.9 | — | — | — | — | — | 0.9* | — |
| Ebner Clay | 2 | — | — | — | — | 2 | — | — | 2 | — |
| High Lead Glass Frit | — | 1 | — | 1 | 1 | — | 1 | — | — | 2 |
| Borosilicate Glass Frit | — | — | 2 | — | — | — | — | — | — | — |
| Fluorite | — | — | — | — | — | — | — | 2 | — | — |
| Kaolin | — | 1 | — | 0.2 | 1 | — | — | — | — | — |
| Zircon | — | — | — | — | — | — | 1 | — | — | — |
| Resistance, Ohms | 1.2 | 2.3 | 1.2 | 0.1 | 15 | 15 | 0.3 | 0.1 | 3.6 | 0.4 |

*Added as boride

Many variations and modifications of the invention will be evident to those skilled in the art without departing from its spirit and scope. For example, conductive bodies of this invention may be used as conductive coatings on various substrates. The mixed powders, slurried in water, may be applied to the substrate by spraying or painting and subsequently dried and heated at high temperature to yield a conductive glaze. It is also possible to feed the dry powdered mixture through a plasma spray gun to give the conductive coating directly on the desired substrate.

What is claimed is:

1. A process for the preparation of a glassy-ceramic body having desired electrical characteristics which comprises heating a finely divided admixture of about 1 to 30% by weight of boron and 99 to 70% by weight of a Group 6b metal selected from chromium, molybdenum, tungsten, and mixtures thereof, based on the total weight of metals present which may be in elemental, alloy, boride or sulfide form, with glassy-ceramic-forming material selected from silica glasses, borate glasses, phosphate glasses, slags, fluorite, frits, clays having natural glass-forming constituents, and mixtures thereof, at a temperature in the range of about 800° to 1350°C. to produce said glassy-ceramic body.

2. A process for the preparation of a glassy-ceramic body having desired electrical characteristics which comprises heating a finely divided admixture of about 1 to 30% of boron and 99 to 70% by weight of a Group 6b metal selected from chromium, molybdenum, tungsten, and mixtures thereof, based on the total weight of metals present which may be in elemental, alloy, boride or sulfide form, with glassy-ceramic-forming material selected from silica glasses, borate glasses, phosphate glasses, slags, fluorite, frits, clays having natural glass-forming constituents, and mixtures thereof, at an elevated temperature to effect fusion, grinding the resulting fused product to a powder, admixing said powder with finely divided refractory diluent in the proportions of at least 30% by weight of glass-forming material and at most 70% by weight of refractory diluent, and heating the resulting admixture at a temperature in the range of about 800° to 1350°C. to produce said glassy-ceramic body.

3. A process for the preparation of a glassy-ceramic body having desired electrical characteristics which comprises heating a finely divided admixture of about 1 to 30% by weight of boron and 99 to 70% by weight of a Group 6b metal selected from chromium, molybdenum, tungsten, and mixtures thereof, based on the total weight of metals present which may be in elemental, alloy, boride or sulfide form, with glassy-ceramic-forming material selected from silica glasses, borate glasses, phosphate glasses, slags, fluorite, frits, clays having natural glass-forming constituents, and mixtures thereof at a temperature above the softening temperature of said glass-ceramic-forming material, and cooling the resulting material to produce said glass-ceramic body.

4. A process for the preparation of a glassy-ceramic body having desired electrical characteristics which comprises heating a finely divided admixture of about 1 to 30% by weight of boron and 99 to 70% by weight of a Group 6b metal selected from chromium, molybdenum, tungsten, and mixtures thereof, based on the total weight of metals present which may be in elemental, alloy, boride or sulfide form, with glassy-ceramic-forming material selected from silica glasses, borate glasses, phosphate glasses, slags, fluorite, frits, clays having natural glass-forming constituents, and mixtures thereof, at a temperature between the softening temperature of said admixture and the temperature at which bubbles form in said glassy-ceramic forming material and cooling the resulting material to form said glassy-ceramic body.

5. A process for the preparation of a vitreous body having desired electrical characteristics which comprises heating a finely divided admixture of about 1 to 30% by weight of boron and 99 to 70% by weight of a Group 6b metal selected from chromium, molybdenum, tungsten, and mixtures thereof, based on the total weight of metals present which may be in elemental, alloy, boride or sulfide form, with vitreous-ceramic forming material selected from silica glasses, borate glasses, phosphate glasses, slags, fluorite, frits, clays having natural glass-forming constituents, and mixtures thereof, to a temperature above the softening point of said vitreous-ceramic forming material and cooling the resulting material to form said vitreous body.

6. A glassy-ceramic body made by the process of claim 3.

7. A glassy-ceramic body made by the process of claim 4.

8. A process for the preparation of a glassy-ceramic body having desired electrical characteristics which comprises heating a finely divided admixture of about 1 to 30% by weight of boron and 99 to 70% by weight of a Group 6b metal selected from chromium, molybdenum, tungsten, and mixtures thereof, based on the total weight of metals present which may be in elemental, alloy, boride or sulfide form, with glassy-ceramic-forming material selected from silica glasses, borate glasses, phosphate glasses, slags, fluorite, frits, clays having natural glassforming constituents, and mixtures thereof, at a temperature in the range of about 800° to 1350°C. to produce a hard, refractory, conductive body.

9. The process of claim 8 wherein the Group 6*b* metal is chromium.

10. The process of claim 8 wherein the glassy-ceramic-forming material is frit.

11. The process of claim 8 wherein the glassy-ceramic-forming material has finely divided refractory diluent added thereto in the proportions of at least 30% by weight of glassy-ceramic-forming material and at most 70% by weight of refractory diluent.

12. The process of claim 8 wherein the total weight of metals does not exceed 50% by weight of the finely divided admixture, and said total weight of metals includes about 70% to 99% by weight of chromium.

13. The process of claim 8 wherein the glassy-ceramic-forming material is frit and is diluted with finely divided kaolin in the proportions of at least 30% by weight of frit and at most 70% by weight of kaolin.

14. A process for the preparation of a glassy-ceramic-body having desired electrical characteristics which comprises heating a finely divided admixture of about 1 to 30% of boron and 99 to 70% by weight of a Group 6*b* metal selected from chromium, molybdenum, tungsten, and mixtures thereof, based on the total weight of metals present which may be in elemental, alloy, boride or sulfide form, with glassy-ceramic-forming material selected from silica glasses, borate glasses, phosphate glasses, slags, fluorite, frits, clays having natural glass-forming constituents, and mixtures thereof, at an elevated temperature to effect fusion, grinding the resulting fused product to a powder, admixing said powder with finely divided refractory diluent, and heating the resulting admixture at a temperature in the range of about 800° to 1350°C. to produce a hard, refractory, conductive body.

15. The process of claim 14 wherein the Group 6*b* metal is chromium.

16. The process of claim 14 wherein the glassy-ceramic-forming material together with the refractory diluent is at least 50% by weight of the resulting admixture.

17. The process of claim 14 wherein the glassy-ceramic-forming material is frit and the refractory diluent is kaolin.

18. A ceramic body having electrically conductive characteristics made by the process of claim 8.

19. A ceramic body having electrically conductive characteristics made by the process of claim 9.

20. A ceramic body having electrically conductive characteristics made by the process of claim 14.

21. A process for the preparation of a ceramic body having desired electrical characteristics which comprises heating a finely divided admixture of about 1 to 30% by weight of boron and 99 to 70% by weight of a Group 6*b* metal selected from chromium, molybdenum, tungsten, and mixtures thereof, based on the total weight of metals present which may be in elemental, alloy, boride or sulfide form, with fusible ceramic material selected from silica glasses, borate glasses, phosphate glasses, slags, fluorite, frits, clays having natural glass-forming constituents, and mixtures thereof, to a temperature above the softening point of said fusible ceramic material and cooling the resulting material to form said ceramic body.

22. A ceramic body made by the process of claim 21.

23. A process for the preparation of a ceramic body having desired electrical characteristics which comprises heating a finely divided admixture of boron and a Group 6*b* metal selected from chromium, molybdenum, tungsten, and mixtures thereof, which metal may be in elemental, alloy, boride or sulfide form, with fusible ceramic material selected from silica glasses, borate glasses, phosphate glasses, slags, fluorite, frits, clays having natural glass-forming constituents, and mixtures thereof, to a temperature above the softening point of said fusible ceramic material and cooling the resulting material to form said ceramic body.

24. A process for the preparation of a ceramic body having desired electrical characteristics which comprises heating a finely divided admixture of boron and up to 99% by weight of a Group 6*b* metal selected from chromium, molybdenum, tungsten, and mixtures thereof, based on the total weight of metals present which may be in elemental, alloy, boride or sulfide form, with fusible ceramic material selected from silica glasses, borate glasses, phosphate glasses, slags, fluorite, frits, clays having natural glass-forming constituents, and mixtures thereof, to a temperature above the softening point of said fusible ceramic material, and cooling the resulting material to form said ceramic body.

25. A ceramic body made by the process of claim 23.

* * * * *